United States Patent

Shea et al.

[15] 3,665,201
[45] May 23, 1972

[54] TURBIDIMETER UTILIZING BACK SCATTER

[72] Inventors: James J. Shea, Dearborn Heights; Samuel S. Ochodnicky, Detroit, both of Mich.

[73] Assignee: Gam Rad, Inc., Detroit, Mich.

[22] Filed: Apr. 16, 1970

[21] Appl. No.: 28,996

Related U.S. Application Data

[63] Continuation-in-part of Ser. No. 786,198, Dec. 23, 1968, abandoned.

[52] U.S. Cl............................................250/218, 356/208
[51] Int. Cl. ...............................................G01n 21/26
[58] Field of Search........................................250/218, 239; 356/205–208

[56] References Cited

UNITED STATES PATENTS

| | | |
|---|---|---|
| 2,436,262 | 2/1948 | Miller..............................250/218 X |
| 2,892,378 | 6/1959 | Canada.............................250/218 X |
| 3,279,305 | 10/1966 | Muta et al..........................356/208 |
| 3,306,157 | 2/1967 | Hach...............................250/208 |
| 3,417,251 | 12/1968 | Leonard et al.....................250/218 X |
| 3,498,719 | 3/1970 | Wing et al........................250/218 X |
| 3,506,360 | 4/1970 | Albert............................250/218 X |
| 3,510,666 | 5/1970 | Topol................................250/218 |

*Primary Examiner*—Walter Stolwein
*Attorney*—Harness, Dickey & Pierce

[57] ABSTRACT

A turbidimeter having a probe mounted in a single opening in a fluid flow line which has a smooth uniform face in contact with the flowing fluid, a collimated incident light source and a photosensitive cell positioned to receive back scatter light 4 Claims, 3 Drawing Figures

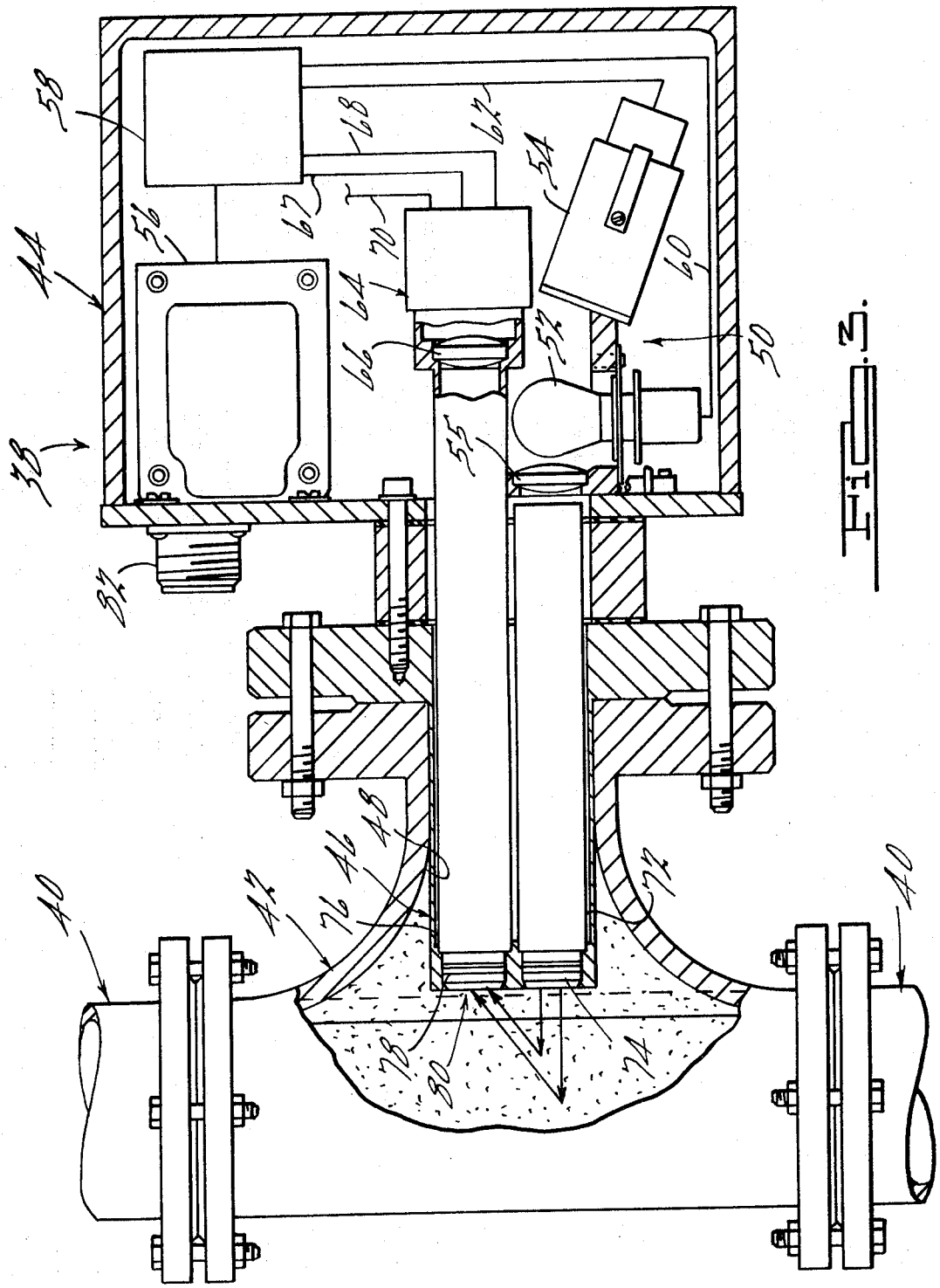

TURBIDIMETER UTILIZING BACK SCATTER

CROSS REFERENCE TO RELATED APPLICATION

This application is a continuation-in-part of my copending application filed Dec. 23, 1968, Ser. No. 786,198, entitled "Turbidimeter Utilizing Back Scatter," now abandoned, and assigned to the same assignee as this application.

SUMMARY BACKGROUND OF THE INVENTION

The present invention relates to turbidimeters and more particularly to a turbidimeter which provides an indication of turbidity of a liquid solution by sensing back scatter.

Present commercial devices for providing an indication of turbidity of a liquid solution are of two types, (1) those which operate on absorption and (2) those which operate on scattered light.

The absorptive type devices conventionally have a light source at one side of a sampling tube and a photosensitive device at an opposite side of the tube; the amount of light transmitted will generally vary as a function of the degree of turbidity which will result in a corresponding indication by the photosensitive device.

The scattered light devices operate on reflected or scattered light; conventionally such devices operate on the Tyndall Effect and utilize a light source and a photosensitive device which are located at an angle of 90° relative to each other.

Both the absorption and the Tyndall Effect devices have effective practical operating range limits and for solutions which have heavy particle concentrations, i.e. above 1,000 p.p.m., the effectiveness of both types in providing accurate indications is impaired. At lease one cause of this impairment is the distance between the light source and the photosensitive element which is usually fixed by practical, flow requirements and becomes very significant with greater turbidities.

The present invention, instead of relying on absorption or Tyndall Effect, utilizes back scatter, i.e. scattered light which is reflected back towards the source of incident light. A device utilizing this effect can be constructed which can readily provide indications for concentrations as high as 30,000 to 50,000 p.p.m. According to one aspect of this invention, a device is provided having the photosensitive device and light source mounted behind a smooth uniform face contacting the flowing solution being measured. As a result, reflections from the surface of the solution is avoided and buildup of particles in the solution on the face is avoided. According to another aspect of this invention, a source of collimated light is provided in combination with a photosensitive device axially displaced therefrom so as to minimize reflections from opposed surfaces of the pipe containing the solution which reach the photosensitive device. More particularly, by virtue of the collimated light beam, the light striking the opposing walls of the pipe will have an incidence angle of 90° with respect to the axis of the pipe and accordingly, the angle of reflection from these walls is also 90° with respect to the axis of the pipe. Therefore, the light reflected from the walls of the pipe will not diverge in an axial direction so as to strike the photosensitive device. As a result, the ambient or quiescent level of light received from the photosensitive device is minimized.

Therefore, it is an object of the present invention to provide a new and improved turbidimeter of the above described type.

It is another object of the present invention to provide a turbidimeter having the light source and photosensitive element located behind a smooth, uniform face contacting the flowing fluid.

It is still another object of the present invention to provide a turbidimeter having a source of collimated light in combination with an axially displaced photosensitive element.

Other objects, features and advantages of the present invention will become apparent from the subsequent description and the appended claims, taken in conjunction with the accompanying drawings, in which:

FIG. 3 is a side cross-sectional view of a second embodiment of a turbidimeter probe of the present invention.

Figure 1:
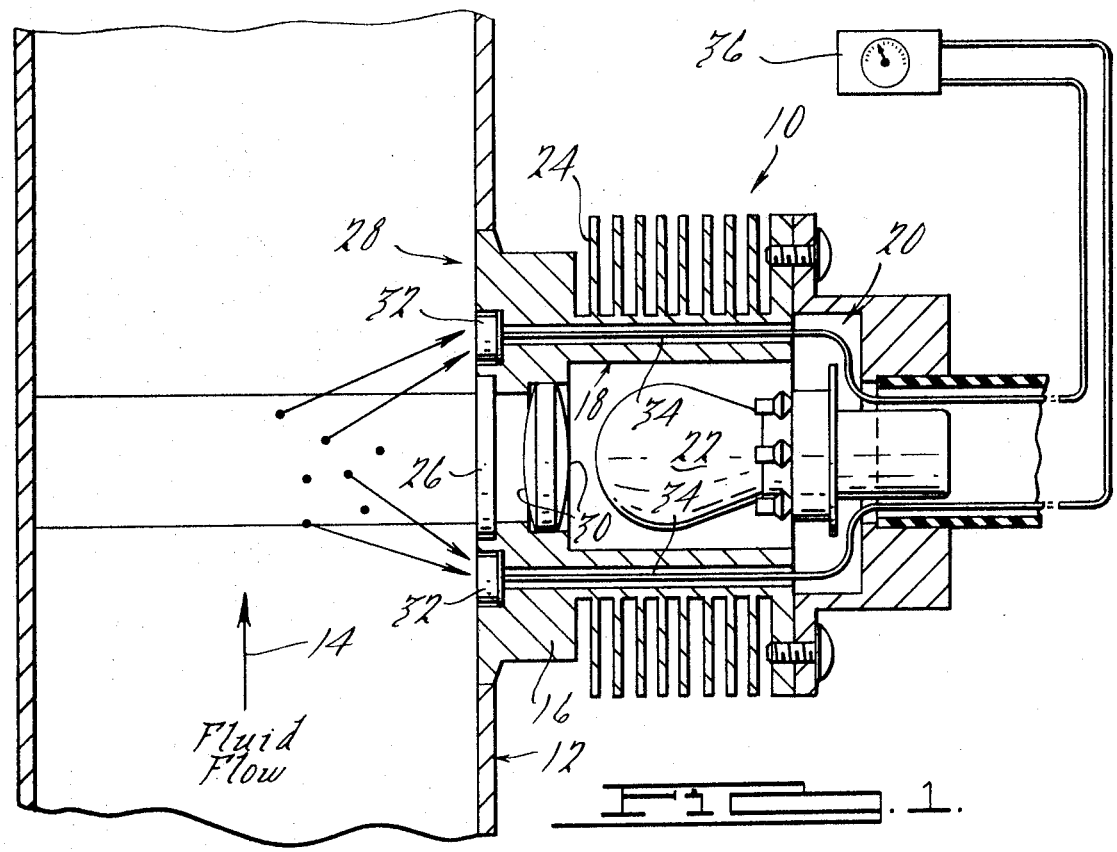
FIG. 1 is a partial schematic diagram with a turbidimeter probe of the present invention shown in section generally as viewed along the lines 1—1 in FIG. 2.

Looking to the drawings, a turbidimeter probe 10 is shown mounted to a fluid flow line 12 (FIG. 1) in which fluid is provided to flow generally in the direction of the arrow 14. The turbidimeter 10 has an annular housing 16 which has a central through bore 18. A light source assembly 20 is mounted at the rear of the housing 16 and has a light 22 located within the bore 18. The light 22 can be energized by a suitable source of electrical energy. The housing 16 has cooling fins 24 to dissipate the heat from the light 22. The forward end of the bore 18 is closed by a transparent window 26. Thus, as constructed, the front face 28 of the turbidimeter probe 10 provides a generally smooth, uniform surface to fluid in line 12 to accordingly expose the front face 28 to smooth fluid flow. As can be best seen in FIG. 1, the front face 28 is generally flush with the wall of the line 12 so as to further contribute to smooth flow across the face 28. A pair of lenses 30 are located between the light 22 and the window 26 and serve to collimate the beam from light 22. A pair of disk-shaped photosensitive elements 32 are located in cavities in the front surface 28. These elements 32 are located as close to the inner end of bore 18 as possible in order to provide the shortest possible path for back scattered light. As can be best seen in FIG. 2, the photosensitive elements 32 are axially displaced from the light source windows 26. The elements 32 are electrically connected via conductors 34 to a suitable instrument 36 which is provided to be sensitive to variation in the electrical characteristic of the photosensitive elements 32 to provide an indication of variation of this characteristic. Since the elements 32 will sense only back scatter, the variation indicated by the instrument 36 can be correlated with variations in the degree of turbidity in the fluid flowing through line 12.

Since the face of the turbidimeter is in contact with the flowing fluid, there is no fluid surface from which the incident light will be reflected, and consequently, high ambient levels of light at the photosensitive device are avoided which would obscure small changes in light intensity due to small changes in turbidity. Moreover, since the surface which is in contact with the flowing fluid is smooth and uniform, buildup of suspended particles on the optical surfaces of the turbidimeter, which would cause obscuring of the incident light beam and the returning light beam, is avoided. As a result, cumbersome cleaning structures such as brushes and the like are unnecessary.

Note that only a single opening is required in the line 12 hence providing for simplified installation. In addition, the device provides a means for obtaining an indication of turbidity of solutions having heavy particle concentrations since the distance from the incident light from the source 22 to the photosensitive elements 32 is a minimum. It should be understood that while the device of the present invention does have special utility for applications in which there are great concentrations of particles it can be effectively used for low concentration also, i.e. 10–50 p.p.m.

Further note that the number of elements 32 used can be varied such that additional elements could be added for greater output or only one element can be used where a lower output can be accepted.

In FIG. 3, a second exemplary embodiment of a turbidimeter probe according to this invention is shown. The turbidimeter probe 38 of FIG. 3 is illustrated as mounted to a fluid flow line 40 by means of a flanged tee 42. The turbidimeter 38 has a housing 44 including a probe section 46 which extends through a side opening 48 in the flanged tee 42. The housing 44 is secured to the flanged tee 42 by means of flanges and bolts as shown. The housing 44 contains a light source assembly 50 including a light bulb 52 and a light bulb monitor assembly 54. The light source assembly 50 further includes a collimating lens 55 receiving the light from the lamp 52 and providing a collimated light beam. Electrical power from a transformer 56 is supplied through a control unit 58 to the light bulb 52 on a conductor 70. The control unit 58 is responsive to an output signal from the light bulb monitor assembly 54 on line 62 so as to adjust the voltage supplied to the light bulb 52 in inverse relationship to the intensity of the light to maintain the intensity of the light from the light bulb 52 at a substantially constant level. Generally, the voltage supplied to the light bulb 52 is lower than the design operating voltage to provide extended bulb life. The housing 44 also contains a back scatter light detector assembly 64 which includes focusing lens 66, a photosensitive element, a temperature sensor, and an oven assembly which substantially surrounds the photosensitive element. The power supply to the oven assembly is controlled so as to maintain the temperature of the photosensitive element substantially constant, for example, by means of the control unit 58 which may receive a signal on line 67 representative of the temperature of the photosensitive element and provide a heating current on line 68 in inverse relationship thereto to maintain the temperature of the photosensitive element at a calibration level. A line 70 from the photosensitive element is provided which carries a signal representative of the intensity of the back scatter light received by the photosensitive element.

The housing probe portion 46 contains a light tube 72 for transmission of collimated light from the source 52 through a glass window 74 into the solution flowing in the pipe 40. The housing probe portion 46 further includes a back scatter light transmission tube 76 which communicates a second window 78 receiving back scattered light with the focusing lens 66 of the back scatter light detector assembly 64. For reasons to be apparent hereinafter, the windows 74 and 78 are displaced or separated a predetermined distance. As can be seen in FIG. 3, the turbidimeter 38 has a face 80 including the windows 74 and 78 which exposes a smooth, uniform surface to fluid flowing in the line 40. Additionally, the face 80 is substantially flush with the nominal walls of the pipe 40 and the tee 42.

The turbidimeter 38 is provided with an external connector 82 which receives the signal on line 70 representative of the intensity of the back scatter light for transmittal to a remote turbidity indicator. The connector further includes an input terminal to receive electrical power which is delivered to the transformer 56.

Figure 2:
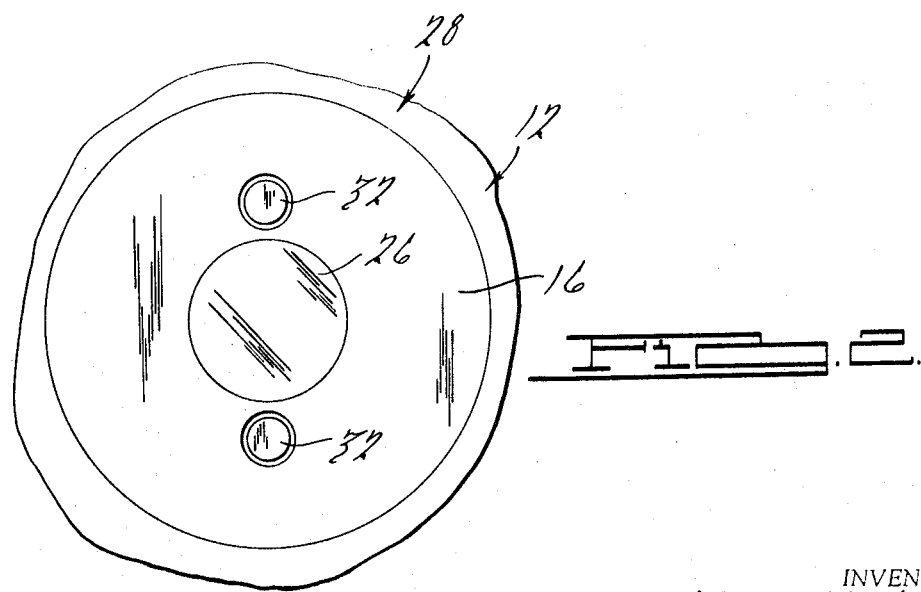
FIG. 2 is a front elevational view of the turbidimeter probe of FIG. 1.

Note that the face 28 of the embodiment of FIG. 1 and 2 and the face 80 of the embodiment of FIG. 3 through which the incident light is transmitted and the back scatter light is received are fully wet by the fluid flowing in the line. This feature avoids surface reflections from the fluid which would result in a high ambient or quiescent level of light at the photosensitive device. Additionally, the smooth, uniform faces 28 and 80 prevent the buildup of the particles suspended in the fluid, and consequent obscuring of the incident light beam and the returning back scatter light such buildup would create. This feature of this invention alleviates the need for brushes or other cleaning devices for the optical surfaces.

Through the use of a source of collimated light according to this invention, the light striking the walls of the pipe opposite the face 80 will have an incidence angle of 90° with respect to the axis of the pipe, and accordingly, the angle of reflection from these walls is also 90° with respect to the axis of the pipe. Therefore, minimal light reflection from the walls diverge in an axial direction so as to be received by the photosensitive device. As a result, the ambient or quiescent level of light received by the photo cells is minimized.

Since the ambient or quiescent level of light received by the photosensitive element is minimized by the above related features, the sensitivity of the turbidimeter according to this invention is improved. More specifically, a high ambient level of light is avoided which would obscure low level back scatter light, representative of low turbidity levels, and small changes in the intensity of back scattered light, representative of slight changes in turbidity.

While it will be apparent that the preferred embodiments of this invention disclosed are well calculated to fulfill the objects above stated, it will be appreciated that the invention is susceptible to modification, variation and change without departing from the proper scope or fair meaning of the invention.

What is claimed is:

1. A turbidimeter comprising: a fluid line with a single opening and a wall opposite said single opening, probe means mounted in said single opening for sensing the turbidity of the fluid flowing in the line comprising face means providing a surface contacting said flowing fluid, light source means for providing a source of incident collimating light, first light transmission tube means communicating said source of incident light with said face means so that incident light passes along an axis through said face means into the line substantially perpendicularly to said wall, and photosensitive means for sensing the back scatter light from the incident light received by said photosensitive means, second light transmission tube means communicating said photosensitive means with said face means so that said back scatter light is received along an axis passing through said face means which is substantially parallel to and axially offset from said axis of said incident light, a lens for focusing said back scatter light on said photosensitive means, said photosensitive means for providing an electrical characteristic varying in magnitude in accordance with the variations in the magnitude of the intensity of the back scatter light and instrument means responsive to the variation in the electrical characteristic for providing an indication of the turbidity of the fluid in the line, said source of incident collimated light passing through said face means substantially perpendicularly with respect to said wall providing minimal divergence of light reflected from said wall to said photosensitive means to minimize the quiescent level of light received by the photocell.

2. A turbidimeter comprising:
a fluid line with a single opening and a wall with a portion opposite said single opening, probe means mounted in said single opening for sensing the turbidity of the fluid flowing in the line comprising face means providing a smooth uniform surface contacting said flowing fluid and being substantially aligned with said wall, light source means for providing a source of incident collimated light passing along an axis through said face means into the line substantially perpendicularly to said wall portion and photosensitive means for sensing the back scatter light from the incident light received by said photosensitive means along an axis passing through said face means which is substantially parallel to and axially offset from said axis of said incident light, said photosensitive means for providing an electrical characteristic varying in magnitude in accordance with the variations in the magnitude of the intensity of the back scatter light and instrument means responsive to the variation in the electrical characteristic for providing an indication of the turbidity of the fluid in the line, said source of incident collimated light passing through said face means substantially perpendicularly with respect to said wall portion providing minimal divergence of light reflected from said wall portion to said photosensitive means to minimize the quiescent level of the light received by the photocell.

3. The turbidimeter of claim 2 wherein said probe means further includes: a lens for focusing said back scatter light on said photosensitive means.

4. The turbidimeter of claim 3 with said housing means comprising an integral housing member having an annular housing part with a through bore and with said light source means supported at the outer end of said bore and having a light located within said bore and with said annular housing part having an axially offset bore with said photosensitive element supported therein.

* * * * *